Figures 1, 6:
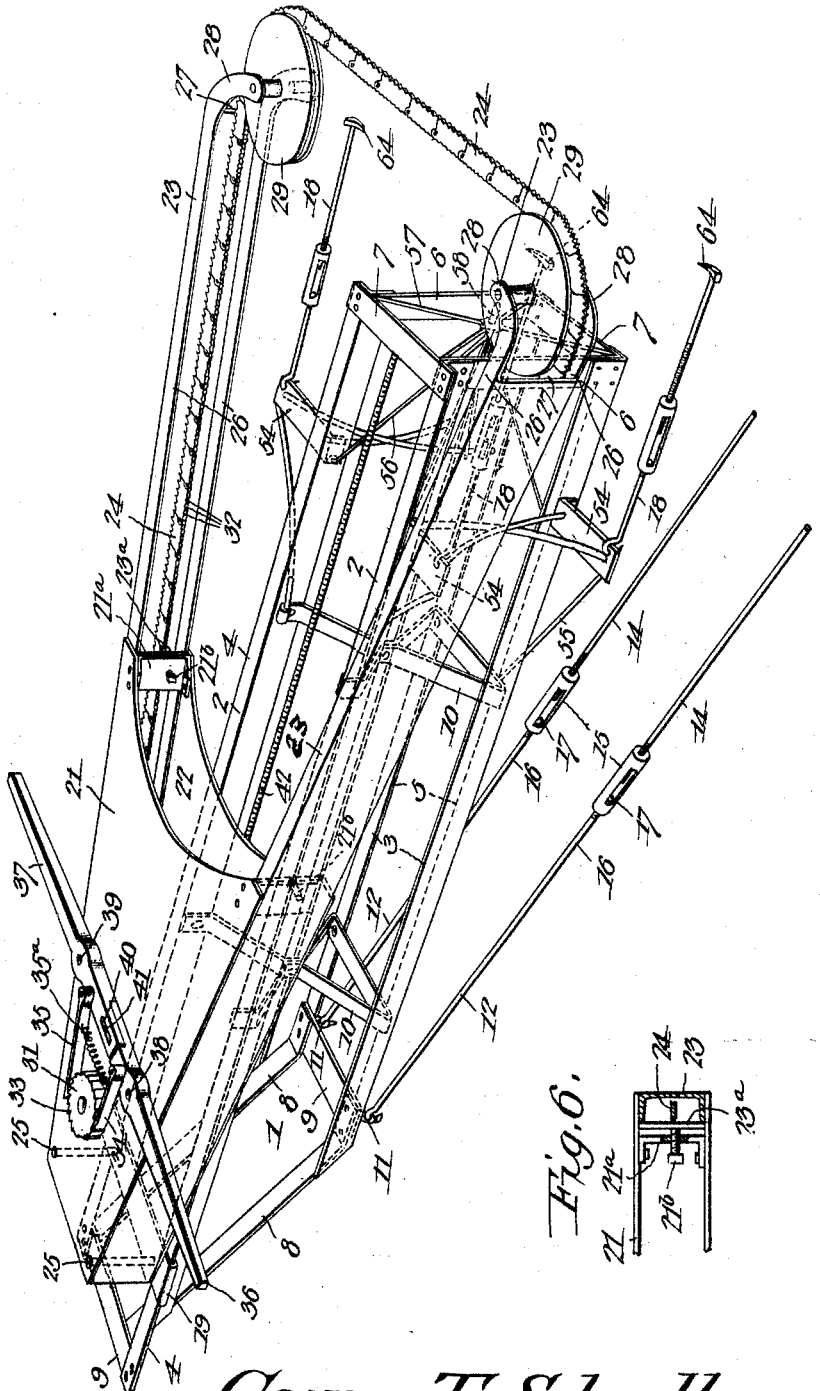

No. 784,184. PATENTED MAR. 7, 1905.
G. T. SEBRELL.
WOOD SAWING MACHINE.
APPLICATION FILED MAY 7, 1904.

2 SHEETS—SHEET 1.

Witnesses:

George T. Sebrell, Inventor,
by
Attorneys.

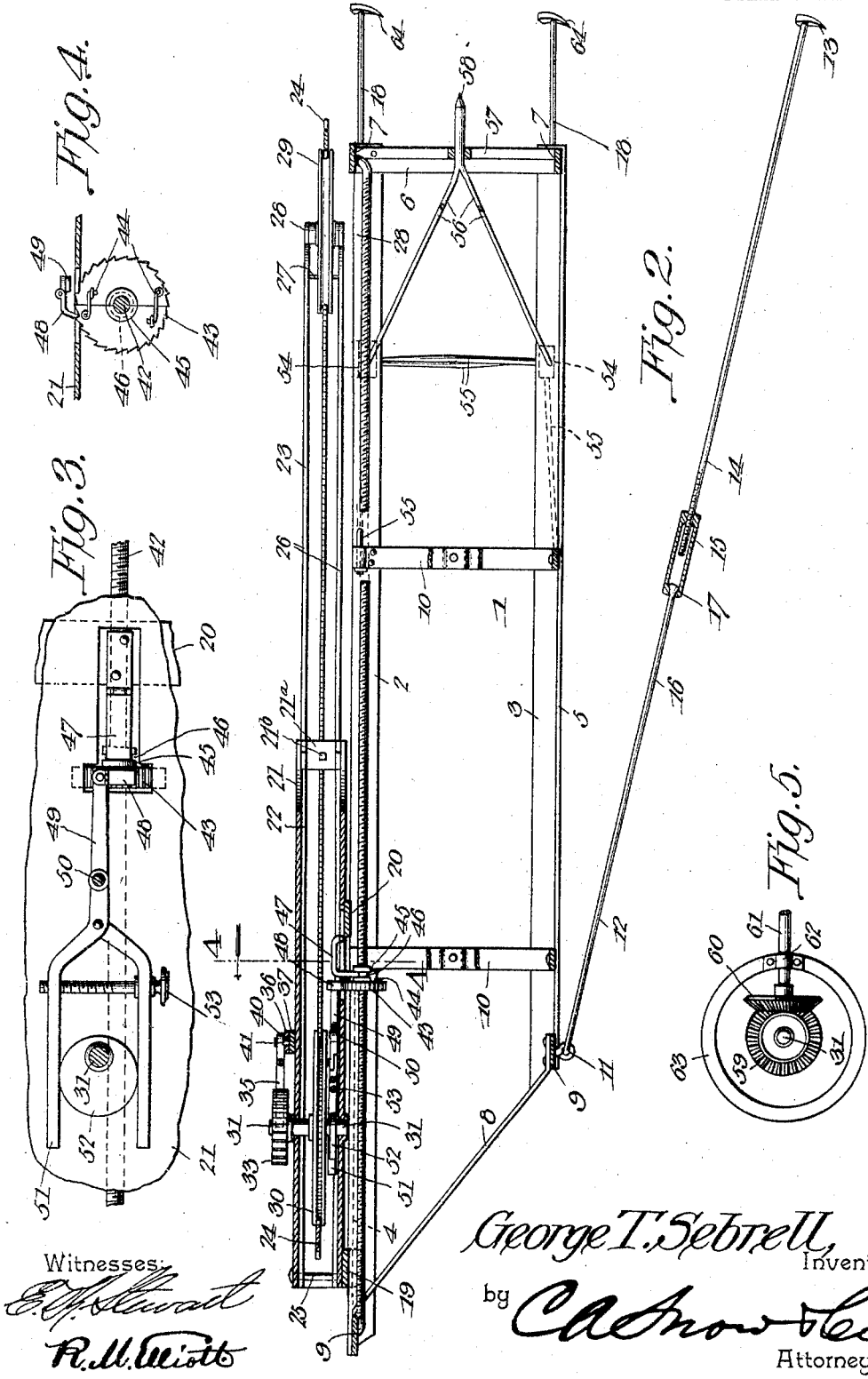

No. 784,184.

Patented March 7, 1905.

UNITED STATES PATENT OFFICE.

GEORGE T. SEBRELL, OF ALSEA, OREGON.

WOOD-SAWING MACHINE.

SPECIFICATION forming part of Letters Patent No. 784,184, dated March 7, 1905.

Application filed May 7, 1904. Serial No. 206,896.

*To all whom it may concern:*

Be it known that I, GEORGE T. SEBRELL, a citizen of the United States, residing at Alsea, in the county of Benton and State of Oregon, have invented a new and useful Wood-Sawing Machine, of which the following is a specification.

This invention relates generally to wood-sawing machines, and particularly to one adapted for felling standing timber, although, as will hereinafter appear, the same is adapted for use in sawing logs.

The object of the invention is in a ready, rapid, and certain manner and with a minimum of danger to the operator to fell standing timber, the cutting being effected in such manner as that the butt of the tree will be perfectly square or true, thus effecting a saving in timber that would be otherwise wasted where the tree is felled with an ax.

Generally stated, the invention comprises a frame having means combined therewith for holding it rigidly secured to a tree, said frame having arranged thereon an endless saw and means for operating the same to cause it to traverse the timber and at the same time to move the saw toward the timber, both movements of the saw being secured through the saw-actuating mechanism. The saw is composed of a series of sections connected, preferably, by a rule-joint, the outer edge of each section being provided with teeth of any preferred contour and either integral with or inserted in the section and the back of each section being provided with serrations or notches to engage with similar parts in the driving-wheel, thereby to effect positive operation of the saw and to prevent its locking within the timber.

The saw-carrying frame is combined with a supporting-frame in such manner as to permit of its being reciprocated thereon, and the saw-feeding mechanism is so constructed that upon the conclusion of the operation the saw-supporting frame may readily be returned to its normal position for further action. The supporting-frame is held associated with the tree to be felled through the medium of a plurality of adjustable guy-rods, the terminals of which are provided with dogs to be driven into the timber, and thus positively hold the structure in position. For purposes of lightness and strength the saw-carrying and saw-supporting frame is each made from structural iron, preferably of the channel and L types, so that while the machine as a whole is comparatively light it will have all the strength and rigidity necessary to cause it to perform the functions for which it is designed.

Further and more specific details of construction will be hereinafter fully described and claimed.

In the accompanying drawings, forming a part of this specification, and in which like characters of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof, and in these drawings—

Figure 1 is a view in perspective of the machine, showing the same in operative position for felling a tree. Fig. 2 is a view in longitudinal section. Fig. 3 is a detail view of a portion of the saw-feeding mechanism. Fig. 4 is a transverse sectional view taken on the line 4 4, Fig. 2, and looking in the direction of the arrow thereon, certain parts of the apparatus being omitted. Fig. 5 is a detail view exhibiting an attachment by which the saw may be operated by power instead of by hand, as shown in Fig. 1. Fig. 6 is a sectional detail view of a portion of the machine.

Referring to the drawings, 1 designates the supporting-frame of the structure, the same comprising four longitudinal L-beams—two upper beams 2 and two under beams 3—the flanges 4 of the beams 2 being disposed outwardly and the flanges 5 of the beams 3 being disposed inwardly. These beams are connected and braced at their forward ends by vertical stays 6 and horizontal stays 7, the said stays being preferably of flat iron and securely riveted or bolted to the beams. The rear ends of the beams are connected by inclined stays 8 and horizontal stays 9, the said stays being also preferably of flat iron and combined with the beams in any preferred manner. In order to hold the frame members against spreading and to render them rigid in use, the cross-braces 10 are employed, which are secured in any preferred manner to the inner sides of the web-flanges of the beams, the braces being connected at the point where they cross each other by a rivet or the like, as usual, thus to prevent any vibratory motion in the use of the machine. To the under side of the rear ends of the beams 3 are connected eyebolts 11, which are engaged by guys 12, the free end of each guy being provided with a head or prong 13 to be driven into the timber, thus to brace the structure against sagging. Each of these guys is by preference constructed of two members, the prong-carrying member 14 being threaded to receive the threaded nut of a turnbuckle 15, the hook member 16 of the guy being provided with a head to engage a socket 17, carried by the turnbuckle, and by the provision of these turnbuckles the guys may be adjusted so as to cause the structure to occupy a horizontal plane and also by coaction with other guys 18, presently to be described, firmly to clamp the structure in position.

The flanges 4 of the beams constitute guides for a pair of slides 19 and 20, the ends of which are underturned to hold them against disconnection from the flanges. Rigidly connected with the slide 19 is a hollow approximately triangular head 21, composed of two members or plates, the forward ends of which are spaced apart and held together by flanged braces 21ª. The space between the members of the head constitutes a channel 22 to receive the saw-supporting arms 23, which being made of channel-iron, with the flanges disposed inward, present guides or housings for the saw 24, presently to be described, the rear ends of the arms 23 being pivoted between the members of the head at 25. The free ends of the arms 23 are curved inward, and the metal between the flanges 26 is cut away at 27 to present two bearings 28 for a pair of grooved guide-sheaves 29, around which passes the saw 24, the side leads of the saw, as before stated, being disposed between the flanges 26 of the arms throughout a portion of their length and thence pass around a drive-sheave 30, supported upon a shaft 31, journaled in suitable bearings in the head, the groove of the sheave 30 being serrated to engage similar serrations 32 on the inner side of the saw. As clearly shown in Fig. 1, the saw is composed of sections assembled by rule-joints, the teeth of the saw being of any preferred design and being integral with the sections or insertible therein. The saw is placed under suitable tension by screws 21ᵇ, which are carried by the braces 21ª and bear against plates 23ª, secured to the flanges 26, as clearly shown in Fig. 6.

The shaft 31 is driven through the medium of a ratchet-wheel 33, which is engaged by two pawls 34 and 35, the former of which is a push-pawl and the latter a pull or drag pawl. These pawls are carried by two levers 36 and 37, respectively, fulcrumed at 38 and 39 upon the head and having their opposing ends overlapped, the inner end of one of the levers being provided with a slot 40, engaged by a pin 41 on the inner end of the other lever. By this arrangement it will be seen that it is immaterial which of the levers is reciprocated when it is desired to transmit motion to the drive-sheave. Of course in practice it is intended that two or more operators shall manipulate each lever; but in the event that there be only two operators these two can actuate one of the levers and effect driving of the saw.

In order to cause a progressive forward movement of the saw-frame, which consists of the head 21, arms 23, and sheaves 29, there is a screw-shaft 42 provided, the respective ends of which are secured in the horizontal stays 7 and 9 of the supporting-frame and are held from turning therein. This screw-shaft is engaged by a ratchet-wheel 43, which is by preference constructed of two parts hinged together, so that its removal from the shaft may readily be effected when the saw-frame is to be retracted, the two sections of the ratchet-wheel in this instance being held assembled through latches 44. The ratchet-wheel is provided with a hub 45, having a circumferential groove 46, which is engaged by a bifurcated arm 47, secured to the slide 20, the connection between the arm and the slide being preferably a hinged one, so that the said arm may be thrown back and move its bifurcated portion out of engagement with the hub of the ratchet-wheel. The ratchet-wheel has motion imparted to it through the medium of a pawl 48, which is carried by one end of a lever 49, fulcrumed at 50 on the under side of the head, the free end of the lever having combined with it an adjustable yoke 51, that straddles an eccentric 52, carried by the shaft 31, the adjustment of the yoke with relation to the eccentric being effected through the medium of a set-screw 53, as clearly shown in Fig. 3. It is designed that the ratchet-wheel shall make a half-revolution on each vibration of the levers, so that upon one stroke of the levers the eccentric will be rotated, and thereby cause the lever 49 to move the ratchet-wheel, and thus move the carriage forward, and upon the opposite stroke of the lever to bring the pawl 48 into fresh engagement with the ratchet-wheel 43 for a subsequent operation.

The guys 18, to which reference has been made, are constructed in the same manner as the guys 12 and are carried by four ears 54, one of which is secured to each of the beams 2 and 3 and projects laterally therefrom. These ears are braced against tendency to yielding through stay-rods 55, there being eight of these stay-rods, two for each ear, the free ends of the rods being suitably assembled with the supporting-frame. In addition to the stay-rods above referred to there are four other brace-rods 56, which are connected at one end to the ears and converge to a point and project through an opening in a spider 57, firmly secured to the outer end of the supporting-frame and on the interior thereof. The portion of the brace-rods 56 that projects beyond the spider forms a prod or spur 58 to be driven into the tree or log, and thus firmly hold the structure from dropping.

Should it be desired to drive the shaft 31 mechanically instead of by hand, as shown, the mechanism shown in Fig. 5 may be employed, which consists of a bevel-gear 59, mounted upon the shaft 31. This bevel-gear is engaged by a single gear 60, carried by a shaft 61, mounted for working in a boxing 62, carried by a turn-table 63, mounted upon the top of the head, the turn-table permitting the shaft to be turned in any direction desired, and power may be imparted to the shaft 61 through means of a tumbler-rod suitably connected therewith.

In the operation of the device the prod or spur is plunged into the tree at the proper distance above the roots, and the prongs 13 and 64 are then driven into the tree, which will operate positively to hold the apparatus in operative relation. The levers 36 and 37 are then operated and impart a traveling movement to the saw 24 and, through the medium of the eccentric 52, the lever 49, the pawl 48, and the ratchet-wheel 43, impart a forward movement of the structure to feed the saw to the timber as fast as requisite. By the provision of the set-screw 53 the yoke of the lever 49 may be adjusted so as to cause it to compensate for any wear of the eccentric.

The invention as a whole is exceedingly simple of construction, will be found thoroughly efficient and durable in use, and by reason of the simplicity of its parts and manner of their assemblage liability of breakage or derangement is reduced to a minimum.

Having thus described the invention, what is claimed is—

1. A machine of the class described comprising a supporting-frame, and means for securing the same to the object to be cut, a head mounted for longitudinal movement upon the frame, arms pivotally connected with the head, guide-sheaves carried by the free ends of the arms, a drive-sheave carried by the head, an endless saw engaging the said sheaves, and pawl-and-ratchet mechanism for imparting forward movement to the head as the cutting progresses.

2. A machine of the class described comprising a supporting-frame, and means for securing the same to the object to be cut, a head mounted for longitudinal movement on the frame, arms pivotally connected with the head, sheaves carried by the arms, a vertical shaft carried by the head, a drive-sheave mounted upon the shaft and having its groove serrated, an endless saw engaging the sheaves and having its back provided with serrations to engage with those of the drive-sheave, a ratchet-wheel mounted upon the shaft of the drive-sheave, a pair of levers fulcrumed upon the head, pawls carried by the levers and engaging the ratchet-wheel, a worm-shaft carried by the supporting-frame, a ratchet-wheel mounted upon the worm-shaft, an eccentric carried by the shaft of the drive-sheave, and a lever carrying at one end a yoke to engage the eccentric and at its other end a pawl to engage the ratchet of the worm-shaft.

3. A machine of the class described comprising a supporting-frame and means for securing the same to the object to be cut, a head mounted for longitudinal movement on the frame, arms pivotally connected with the head, sheaves carried by the arms, a vertical shaft carried by the head, a drive-sheave mounted upon the shaft and having its groove serrated, an endless saw engaging the sheaves and having its back provided with serrations to engage with those of the drive-sheave, a ratchet-wheel mounted upon the shaft of the drive-sheave, a pair of levers fulcrumed upon the head, pawls carried by the levers and engaging the ratchet-wheel, a worm-shaft carried by the supporting-frame, a sectional ratchet-wheel mounted upon the worm-shaft, an eccentric carried by the shaft of the drive-sheave, and a lever carrying at one end a yoke to engage the eccentric and at its other end a pawl to engage the ratchet of the worm-shaft.

4. A machine of the class described comprising a supporting-frame, and means for securing the same to the object to be cut, a head mounted for longitudinal movement on the frame, arms pivotally connected with the head, sheaves carried by the arms, a vertical shaft carried by the head, a drive-sheave mounted upon the shaft and having its groove serrated, an endless saw engaging the sheaves and having its back provided with serrations to engage with those of the drive-sheave, a ratchet-wheel mounted upon the shaft of the drive-sheave, a pair of levers fulcrumed upon the head and having their opposing terminals connected, pawls carried by the levers and engaging the ratchet-wheel, a worm-shaft carried by the supporting-frame, a ratchet-wheel mounted upon the worm-shaft, an eccentric carried by the shaft of the drive-sheave, and a lever carrying at one end a yoke to engage the eccentric and at its other end a pawl to engage the ratchet of the worm-shaft.

5. A machine of the class described comprising a supporting-frame and means for securing the same to the object to be cut, a head mounted for longitudinal movement upon the frame, arms pivotally connected with the head, guide-sheaves carried by the free ends of the arms, a drive-sheave carried by the head, an endless saw engaging the said sheaves, means for maintaining the saw under tension, and means for imparting forward movement to the head as the cutting progresses.

6. A machine of the class described comprising a supporting-frame, a head mounted for longitudinal movement on the frame, arms pivotally connected with the head, sheaves carried by the arms, a vertical shaft carried by the head, a drive-sheave mounted upon the shaft and having its groove serrated, an endless saw engaging the sheaves and having its back provided with serrations to engage those of the drive-sheave, means for maintaining the saw under tension, means for imparting forward movement to the head as the cutting progresses, and means for driving the vertical shaft to effect operation of the saw.

7. A machine of the class described comprising a supporting-frame, a head mounted for longitudinal movement thereon, arms pivotally connected with the head, an endless saw supported by the arms, and bolts carried by the head and adapted to engage the arms to spread the same, thus to place and maintain the saw under requisite tension.

In testimony that I claim the foregoing as my own I have hereto affixed my signature in the presence of two witnesses.

GEORGE T. SEBRELL.

Witnesses:
   FINLEY FULLERTON,
   WALTER J. CATHCART.